(12) United States Patent
Steinacher et al.

(10) Patent No.: US 10,773,430 B2
(45) Date of Patent: Sep. 15, 2020

(54) THERMOPLASTIC COMPOSITE PART MANUFACTURING SYSTEM AND METHOD

(71) Applicant: The Boeing Company, Chicago, IL (US)

(72) Inventors: Philip P. Steinacher, Carrollton, IL (US); Randall Dow Wilkerson, O'Fallon, MO (US); James Rodney Fox, University City, MO (US); Michael Palmore Matlack, St Charles, MO (US); Ryan Joseph Merriman, Ballwin, MO (US); Donald C. Besselsen, Lake St. Louis, MO (US); David Phillip Bruk, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 220 days.

(21) Appl. No.: 15/496,302

(22) Filed: Apr. 25, 2017

(65) Prior Publication Data
US 2018/0304503 A1 Oct. 25, 2018

(51) Int. Cl.
*B29C 43/28* (2006.01)
*B29C 43/52* (2006.01)
(Continued)

(52) U.S. Cl.
CPC .............. *B29C 43/28* (2013.01); *B29C 43/34* (2013.01); *B29C 43/44* (2013.01); *B29C 43/52* (2013.01);
(Continued)

(58) Field of Classification Search
CPC ............ B29D 99/0003; B29K 2101/12; B29K 2105/256; B29C 43/06; B29C 43/04;
(Continued)

(56) References Cited

U.S. PATENT DOCUMENTS 3,836,425 A * 9/1974 Whiting, Jr. ............ B32B 15/08
428/213
4,151,031 A * 4/1979 Goad .................... B29C 53/043
156/201
(Continued)

FOREIGN PATENT DOCUMENTS

DE 4017878 A1 12/1991

OTHER PUBLICATIONS

Extended European Search Report, dated Oct. 1, 2018, regarding Application No. 18158814.6, 5 pages.

*Primary Examiner* — Peter L Vajda
*Assistant Examiner* — S. Behrooz Ghorishi
(74) *Attorney, Agent, or Firm* — Yee & Associates, P.C.

(57) ABSTRACT

A method and apparatus for a continuous compression molding machine. The continuous compression molding machine comprises a tooling die, extending through a heating zone and a cooling zone, a tooling sleeve, and a biasing system. The tooling sleeve corresponds to the tooling die and is for use in forming a thermoplastic composite part from a thermoplastic composite charge when the tooling sleeve with the thermoplastic composite charge is moved with respect to the tooling die through the heating zone and the cooling zone. The biasing system is configured to hold the thermoplastic charge at a first angle within the heating zone and hold the thermoplastic composite charge at a second angle within the cooling zone, as the tooling sleeve moves through the heating zone and the cooling zone with the thermoplastic composite charge. The first angle is different from the second angle.

20 Claims, 12 Drawing Sheets

(51) Int. Cl.
  *B29C 43/44* (2006.01)
  *B29C 43/34* (2006.01)
  *B29D 99/00* (2010.01)
  *B29C 70/50* (2006.01)
  *B29K 101/12* (2006.01)
  *B29K 105/00* (2006.01)

(52) U.S. Cl.
  CPC .......... *B29C 70/50* (2013.01); *B29D 99/0003* (2013.01); *B29C 2043/522* (2013.01); *B29C 2043/527* (2013.01); *B29K 2101/12* (2013.01); *B29K 2105/256* (2013.01)

(58) Field of Classification Search
  CPC ......... B29C 43/28; B29C 43/34; B29C 43/44; B29C 43/52; B29C 70/50; B29C 2043/522; B29C 2043/527
  See application file for complete search history.

(56) References Cited

U.S. PATENT DOCUMENTS

| | | | |
|---|---|---|---|
| 4,913,910 A * | 4/1990 | McCarville | B29C 53/04 264/286 |
| 5,192,383 A * | 3/1993 | Cavin | B29C 70/52 156/166 |
| 8,491,745 B2 | 7/2013 | Wilkerson et al. | |
| 8,691,137 B2 | 4/2014 | Prebil et al. | |
| 2015/0129118 A1* | 5/2015 | Hickman | B32B 37/1027 156/199 |
| 2016/0144578 A1 | 5/2016 | Wilkerson et al. | |

* cited by examiner

THERMOPLASTIC COMPOSITE PART MANUFACTURING SYSTEM AND METHOD

GOVERNMENT LICENSE RIGHTS

This disclosure was made with United States Government support under Contract No. FA8650-14-C-5612. The United States Government has certain rights in this disclosure.

BACKGROUND INFORMATION

1. Field

The present disclosure relates generally to manufacturing composite parts and, in particular, to a system and method for manufacturing thermoplastic composite parts.

2. Background

In the manufacturing of composite parts, continuous compression molding may be used to form thermoplastic composite parts. With this type of manufacturing, materials such as continuous fiber reinforcements pre-impregnated with high-end thermoplastics may be used. These types of materials may include, for example, polyetheretherketone (PEEK), polyetherketoneketone (PEKK), polyetherimide (PEI), polyphenylene sulfide (PPS) resins, and carbon or fiberglass unidirectional or fabric fiber reinforcements. The composite parts may take various forms such as, for example, an I beam. The flanges of the I beam may spring inwardly as the part moves from a heating zone to a cooling zone during a continuous compression molding consolidation cycle and is subsequently removed from the continuous compression molding machine.

Currently, this type of spring back is taken into account by holding portions of the thermoplastic composite part in a more open position. For example, the flanges of the I beam may be held open to a constant angle of 92 degrees such that when the part is removed from the sleeve of the continuous compression machine, the flanges spring back to the desired 90 degrees.

However, this technique results in reduced structural integrity and geometric consistency. This reduction in structural integrity may be caused by residual stresses present in locations such as the corner radii of the I beam. The reduction in geometric consistency can create fit problems when installed into an assembly with other components.

Therefore, it would be desirable to have a method and apparatus that take into account at least some of the issues discussed above, as well as other possible issues. For example, it would be desirable to have a method and apparatus that overcome a technical problem with manufacturing thermoplastic composite parts with a desired level of integrity.

SUMMARY

An embodiment of the present disclosure provides for a continuous compression molding machine. The continuous compression molding machine comprises a tooling die, extending through a heating zone and a cooling zone, a tooling sleeve, and a biasing system. The tooling sleeve corresponds to the tooling die and is for use in forming a thermoplastic composite part from a thermoplastic composite charge when the tooling sleeve, with the thermoplastic composite charge, is moved with respect to the tooling die through the heating zone and the cooling zone. The biasing system is configured to hold the thermoplastic charge at a first angle within the heating zone and hold the thermoplastic composite charge at a second angle within the cooling zone, as the tooling sleeve moves through the heating zone and the cooling zone with the thermoplastic composite charge. The first angle is different from the second angle.

Another embodiment of the present disclosure provides for a method for forming a thermoplastic composite part in a continuous compression molding machine. The method comprises moving a thermoplastic composite charge for forming the thermoplastic composite part with a tooling sleeve. The tooling sleeve corresponds to a tooling die with respect to the tooling die in a heating zone, wherein the tooling sleeve and the tooling die are located in a continuous compression tooling machine. The method holds the thermoplastic composite charge at a first angle within the heating zone using a biasing system. The method moves the thermoplastic composite charge through a cooling zone. The method holds the thermoplastic composite charge at a second angle within the cooling zone using the biasing system in the continuous compression molding machine, wherein the first angle is different from the second angle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that increasing the structural integrity and geometric consistency of a thermoplastic composite part may be achieved by reducing residual stresses or other undesired conditions that occur when a portion of the thermoplastic composite part springs back after the thermoplastic composite part is removed from the continuous compression molding machine. The illustrative embodiments recognize and take into account that changing the angle of the parts during the manufacturing of the thermoplastic composite parts to take into account the amount of spring back that may occur for a portion of the thermoplastic composite part may increase the structural integrity, as well as other parameters, of the thermoplastic composite part.

The illustrative embodiments provide a method and apparatus for manufacturing thermoplastic composite parts. In one illustrative example, a continuous compression molding machine comprises a tooling die, a tooling sleeve, and a biasing system. The tooling die extends through a heating zone and a cooling zone. The tooling sleeve corresponds to the tooling die for forming a thermoplastic composite part from a thermoplastic composite charge when the tooling sleeve, with the thermoplastic composite charge, is moved with respect to the tooling die through the heating zone and the cooling zone. The biasing system is configured to hold the thermoplastic composite charge at a first angle within the heating zone and hold the thermoplastic composite charge at a second angle within the cooling zone as the tooling sleeve moves through the heating zone and the cooling zone with the thermoplastic composite charge. The first angle is different from the second angle.

Figure 1:
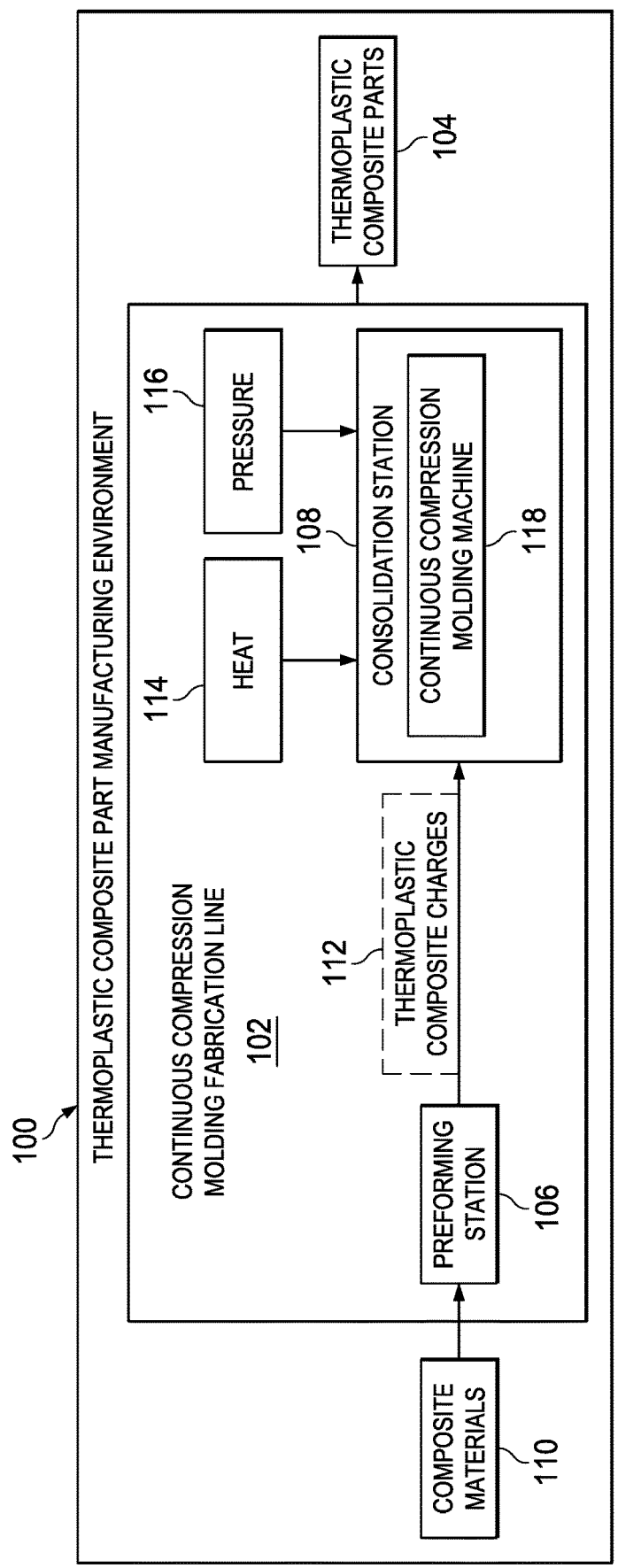
FIG. 1 is an illustration of a block diagram of a thermoplastic composite part manufacturing environment in accordance with an illustrative embodiment.

With reference now to the figures, and in particular, with reference to FIG. 1, an illustration of a block diagram of a thermoplastic composite part manufacturing environment is depicted in accordance with an illustrative embodiment. As depicted, thermoplastic composite part manufacturing environment 100 includes continuous compression molding fabrication line 102. In this example, continuous compression molding fabrication line 102 operates to manufacture thermoplastic composite parts 104.

Thermoplastic composite parts 104 is comprised of one or more thermoplastic materials that may be reheated to change the shape of thermoplastic composite parts 104. Typically, the thermoplastic materials are used in resins for thermoplastic composite parts 104.

Thermoplastic composite parts 104 may take a number of different forms. For example, thermoplastic composite parts 104 may be stiffened members that have a cross-section selected from at least one of an I shape, a flat or curved plate shape, a Z shape, a U or C shape, a T shape, a hat shape, or some other suitable type of shape. One or more illustrative examples may be applied to any thermoplastic composite part that has a feature in which an angle or curve is present.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

The stiffened member may be straight, curved, have a uniform thickness, a non-uniform thickness, or some other suitable shape. Thermoplastic composite parts 104 may be used to form or used in a fuselage skin, a wing skin, a control surface, a door panel, an access panel, a keel beam, a floor beam, a deck beam, a stiffener, a clip, or some other suitable type of application. The thermoplastic part also may be selected from a group comprising a beam, an I beam, a T beam, a stringer, or some other type of part with a shape having angular features.

In this illustrative example, continuous compression molding fabrication line 102 has a number of different components. As depicted, continuous compression molding fabrication line 102 comprises preforming station 106 and consolidation station 108.

Preforming station 106 is a portion of continuous compression molding machine 118 that receives composite materials 110. Composite materials 110 are plies of composite material, filler material or other suitable types of material that may be used to form thermoplastic composite parts 104. As depicted, the plies of composite material may be supplied from at least one of continuous roles or stacks of precut blanks. In this example, composite materials 110 are thermoplastic composite materials.

Preforming station 106 may be used to align and guide the plies in composite materials 110. Additionally, preforming station 106 may form features such as flanges, curved sections, or other features for thermoplastic composite parts 104. The output of preforming station 106 is thermoplastic composite charges 112. Thermoplastic composite charges 112 generally have a shape for thermoplastic composite parts 104.

Thermoplastic composite charges 112 are sent into consolidation station 108. Consolidation station 108 applies at least one of heat 114 or pressure 116 to thermoplastic composite charges 112, while thermoplastic composite charges 112 move through consolidation station 108. The output from consolidation station 108 is thermoplastic composite parts 104.

In this illustrative example, one or more features in the illustrative examples may be implemented using continuous compression molding machine 118 in consolidation station 108. Continuous compression molding machine 118 may be configured in a manner that increases desired characteristics of thermoplastic composite parts 104. For example, thermoplastic composite parts 104 may have at least one of increased structural integrity, strength, longevity, or other desired characteristics relative to parts not manufactured using continuous compression molding machine 118.

Figure 2:
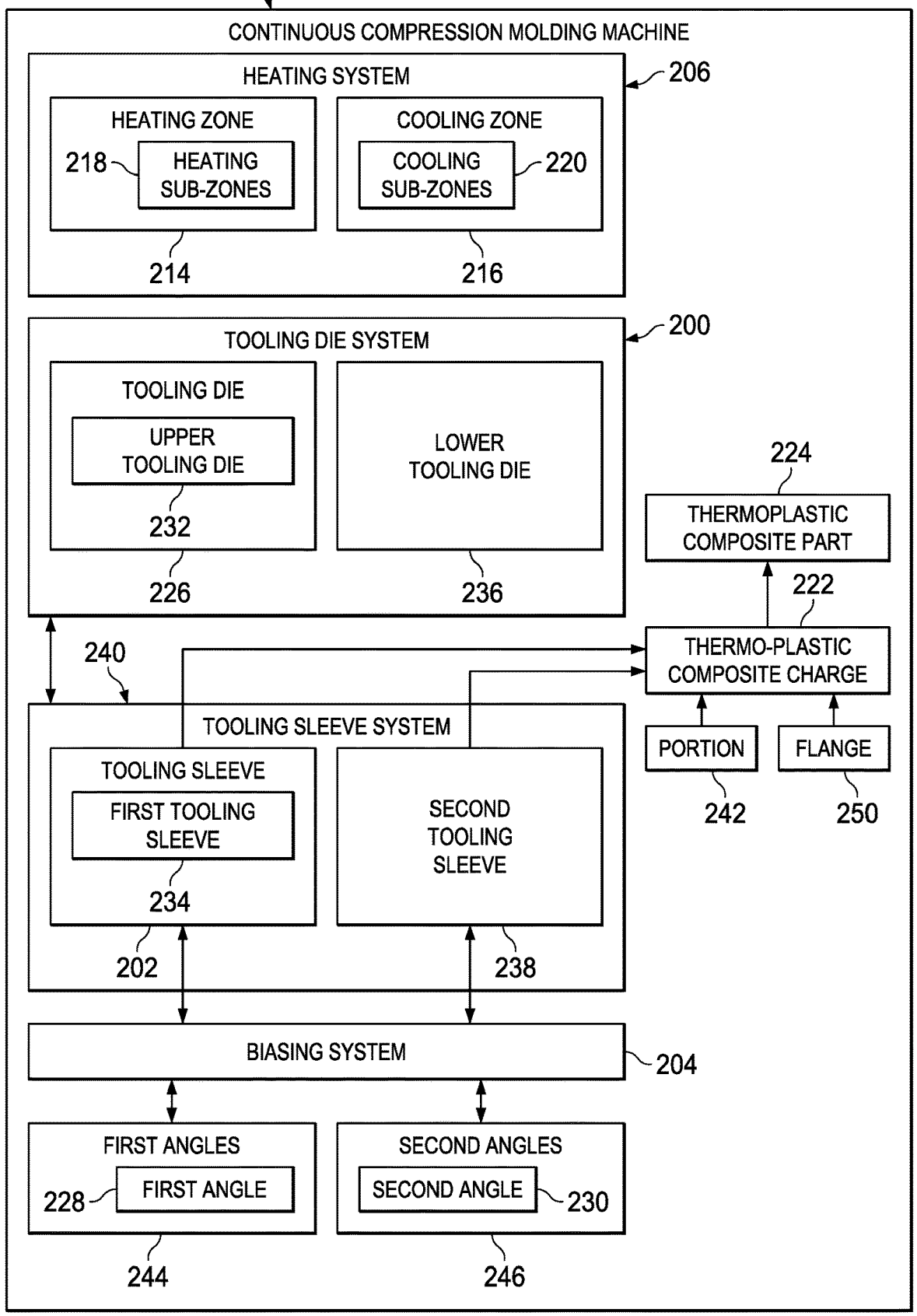
FIG. 2 is an illustration of a block diagram of a continuous compression molding machine in accordance with an illustrative embodiment.

With reference now to FIG. 2, an illustration of a block diagram of a continuous compression molding machine is depicted in accordance with an illustrative embodiment. This figure illustrates examples of components that may be used in continuous compression molding machine 118 in FIG. 1.

In the illustrative example, continuous compression molding machine 118 is comprised of a number of different components. As depicted, continuous compression molding machine 118 includes tooling die system 200, tooling sleeve 202, biasing system 204, and heating system 206.

In this illustrative example, heating system 206 comprises heating zone 214 and cooling zone 216. Each of the zones may have sub-zones in which the temperatures are selected for each of the zones. For example, heating zone 214 may have a group of heating sub-zones 218 in which each sub-zone has a different temperature for heating thermoplastic composite charge 222 as part of the process for forming thermoplastic composite part 224. As another example, cooling zone 216 may have a group of cooling sub-zones 220.

As used herein, a "group of" when used with reference items means one or more items. For example, a group of heating sub-zones 218 is one or more heating sub-zones.

In this illustrative example, thermoplastic composite charge 222 is an example of a charge in thermoplastic composite charges 112 in FIG. 1. Thermoplastic composite part 224 is an example of a part in thermoplastic composite parts 104 in FIG. 1.

In the illustrative example, tooling die system 200 includes tooling die 226. Tooling die 226 extends through heating zone 214 and cooling zone 216 in heating system 206.

As depicted, tooling sleeve 202 corresponds to tooling die 226 for forming thermoplastic composite part 224 from thermoplastic composite charge 222 when tooling sleeve 202 with thermoplastic composite charge 222 are moved with respect to tooling die 226 through heating zone 214 and cooling zone 216. In this illustrative example, tooling sleeve 202 corresponds to tooling die 226 by having a similar shape that allows for tooling sleeve 202 to slide or move along tooling die 226.

For example, tooling sleeve 202 may have a U-shape that allows for tooling sleeve 202 to cover the U-shape and slide or move along the length of tooling die 226. In the illustrative example, tooling sleeve 202 holds thermoplastic composite charge 222. Tooling sleeve 202 is located between thermoplastic composite charge 222 and tooling die 226 in this depicted example.

Biasing system 204 is configured to hold thermoplastic composite charge 222 at first angle 228 within heating zone 214 and hold thermoplastic composite charge 222 at second angle 230 within cooling zone 216 as tooling sleeve 202 moves through heating zone 214 and cooling zone 216 with thermoplastic composite charge 222. In this depicted example, first angle 228 is different from the second angle 230. In other words, these two angles have different values.

In this illustrative example, tooling die 226 is upper tooling die 232 and tooling sleeve 202 is first tooling sleeve 234. As depicted, tooling die system 200 also includes lower tooling die 236, in which lower tooling die 236 extends through heating zone 214 and cooling zone 216. Second tooling sleeve 238 also is present and corresponds to lower tooling die 236 for forming thermoplastic composite part 224 from thermoplastic composite charge 222 when thermoplastic composite charge 222 is moved with respect to lower tooling die 236 through heating zone 214 and cooling zone 216.

In this illustrative example, first tooling sleeve 234 and second tooling sleeve 238 are part of tooling sleeve system 240. Biasing system 204 is configured to cause first tooling sleeve 234 and second tooling sleeve 238 to hold portions 242 of the thermoplastic composite charge 222 at a group of first angles 244 within heating zone 214 and hold portions 242 of thermoplastic composite charge 222 at a group of second angles 246 within cooling zone 216 as first tooling sleeve 234 and second tooling sleeve 238 move through heating zone 214 and cooling zone 216 with thermoplastic composite charge 222.

In the illustrative example, different angles may be present within the group of first angles 244, and different angles may be present within the group of second angles 246. For example, a first angle in the group of first angles 244 for first tooling sleeve 234 may be different from the first angle in the group of first angles 244 for second tooling sleeve 238.

In this example, thermoplastic charge 222 has flange 250. Flange 250 is held at first angle 228 in heating zone 214 and at second angle 230 in cooling zone 216.

Figure 3:
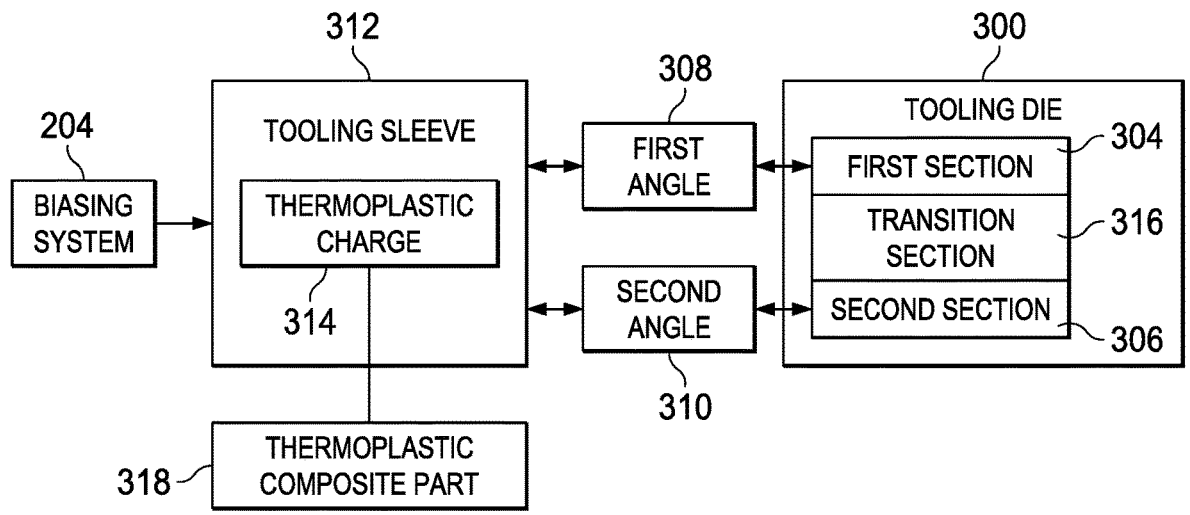
FIG. 3 is an illustration of a block diagram of angles for a tooling die and a tooling sleeve in accordance with an illustrative embodiment.

With reference to FIG. 3, an illustration of a block diagram of angles for a tooling die and a tooling sleeve is depicted in accordance with an illustrative embodiment. In this illustrative example, tooling die 300 is a tooling die within tooling die system 200 of FIG. 2. Tooling die 300 has first section 304 and second section 306. As depicted, first section 304 has first angle 308 and second section 306 has second angle 310.

Tooling sleeve 312 is a tooling sleeve within tooling sleeve system 240 of FIG. 2. In this example, tooling sleeve 312 corresponds to tooling die 300. The correspondence in this example is one in which tooling sleeve 312 has a shape similar to tooling die 300, such that tooling sleeve 312 may move along tooling die 300 using tooling die 300 as a guide for movement.

In this illustrative example, when tooling sleeve 312 to moves through first section 304 in tooling die 300, tooling sleeve 312 has first angle 308. In this example, tooling sleeve 312 has first angle 308 without being biased. If tooling sleeve 312 normally has first angle 308, tooling sleeve 312 is biased or put under pressure by biasing system 204 to have second angle 310 when tooling sleeve 312 is in second section 306 of tooling die 300.

For example, biasing system 204 applies pressure against tooling sleeve 312 to change from first angle 308 to second angle 310 with tooling sleeve 312 being located between biasing system 204 and tooling die 300. In other words, biasing system 204 applies pressure on tooling sleeve 312 to bend towards tooling die 300 to obtain second angle 310. First angle 308 and second angle 310 are different from each other with first angle 308 being greater than second angle 310 in this particular example.

When tooling sleeve 312 moves into second section 306, biasing system 204 biases or applies pressure against tooling sleeve 312. This change in pressure by biasing system 204 allows tooling sleeve 312 change to second angle 310. This change in angles for tooling sleeve 312 results in a corresponding change to thermoplastic charge 314 carried on tooling sleeve 312 and changes angles in a similar manner.

In this illustrative example, continuous compression molding machine 118 of FIG. 1 also may include transition section 316 in at least one of heating zone 214 or cooling zone 216, shown in FIG. 2, in which a transition from first angle 308 to second angle 310 occurs. The transition is in tooling die 300. This transition in tooling die 300 also causes a transition in tooling sleeve 312 as biasing system 204 applies pressure on tooling sleeve 312 towards tooling die 300.

The length of transition section 316, location of transition section 316, and rate at which first angle 308 changes to second angle 310 in transition section 316, as well as other parameters, depends on a number of different factors. For example, the factors may be selected from at least one of material use, part geometry, part thickness, heating rate, cooling rate, and other suitable parameters. The selection of the length of transition section 316 and the rate at which first angle 308 changes to second angle 310 may be made to reduce stress when forming thermoplastic composite part 318 from thermoplastic charge 314.

In the illustrative example, the change from first angle 308 to second angle 310 does not occur abruptly. Instead, the change from first angle 308 to second angle 310 may occur over some distance extending through at least one of heating zone 214 and cooling zone 216.

The distance selected is based on a number of different factors. In the illustrative example, the factors considered in establishing the distance over which the angle changes from first angle 308 to second angle 310 includes at least one of a material property for the part, a material property for the tool, a processing temperature, a processing rate, a cooling rate, a part geometry, or a tool geometry.

Figure 4:
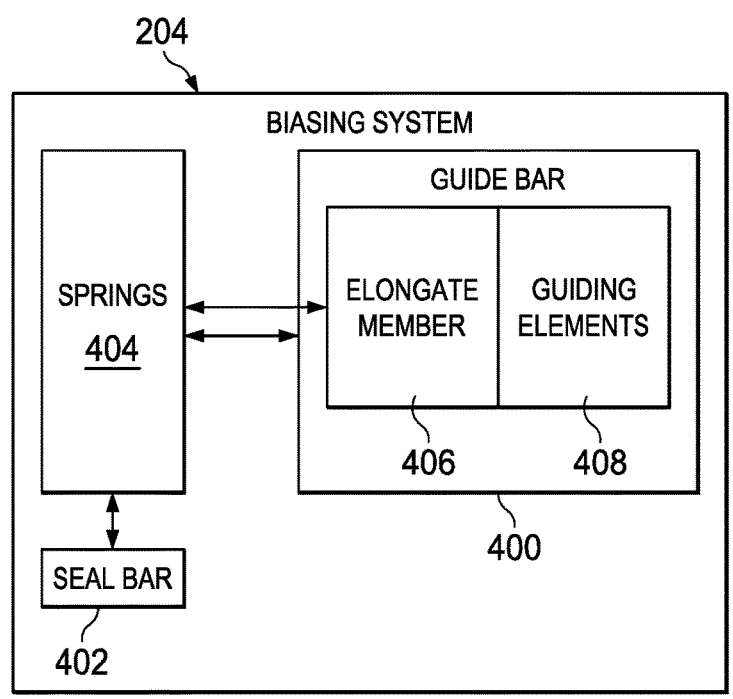
FIG. 4 is an illustration of a block diagram of a biasing system in accordance with an illustrative embodiment.

With reference now to FIG. 4, an illustration of a block diagram of a biasing system is depicted in accordance with an illustrative embodiment. In this figure, an example of components that may be used to implement biasing system 204 are shown. In this illustrative example, biasing system 204 includes guide bar 400 and seal bar 402.

Seal bar 402 primarily functions to reduce or prevent a thermoplastic charge from flowing in an undesired manner. Seal bar 402 applies pressure to create a seal with respect to the thermoplastic charge. Further, in this illustrative example, seal bar 402 applies pressure against a tooling sleeve to maintain a desired angle of the tooling sleeve.

As depicted, springs 404 bias seal bar 402 towards a tooling sleeve. Springs 404 may take a number of forms. For example, springs 404 may be selected from at least one of a Belleville washer, a coil spring, a leaf spring, a compression spring, a variable spring, a flat spring, a serpentine spring, a cantilever spring, or other suitable types of springs.

As depicted, guide bar 400 holds a tooling sleeve at the second angle in the cooling zone, such that the composite charge has the second angle. The guide bar is comprised of elongate member 406 and guiding elements 408. Guiding elements 408 apply pressure to the tooling sleeve, such that the tooling sleeve has the second angle. As depicted, a transition may be present from the first angle to the second angle.

In this illustrative example, guiding elements 408 may take a number of different forms. Guiding elements 408 may be selected from at least one of a pin with rounded edges, a roller, a wheel, or some other suitable type of guiding element.

In one illustrative example, one or more technical solutions are present that overcome a technical problem with manufacturing thermoplastic composite parts with a desired level of integrity. As a result, one or more technical solutions may provide a technical effect in increasing the level of integrity of thermoplastic composite parts, in addition to increasing other characteristics of the thermoplastic composite parts. For example, thermoplastic composite parts manufactured using one or more of the illustrative examples may have at least one of increased strength, reduced maintenance, increased longevity, or other desirable characteristics.

The illustration of thermoplastic composite part manufacturing environment 100 and the different components in FIGS. 1-4 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

Figure 5:
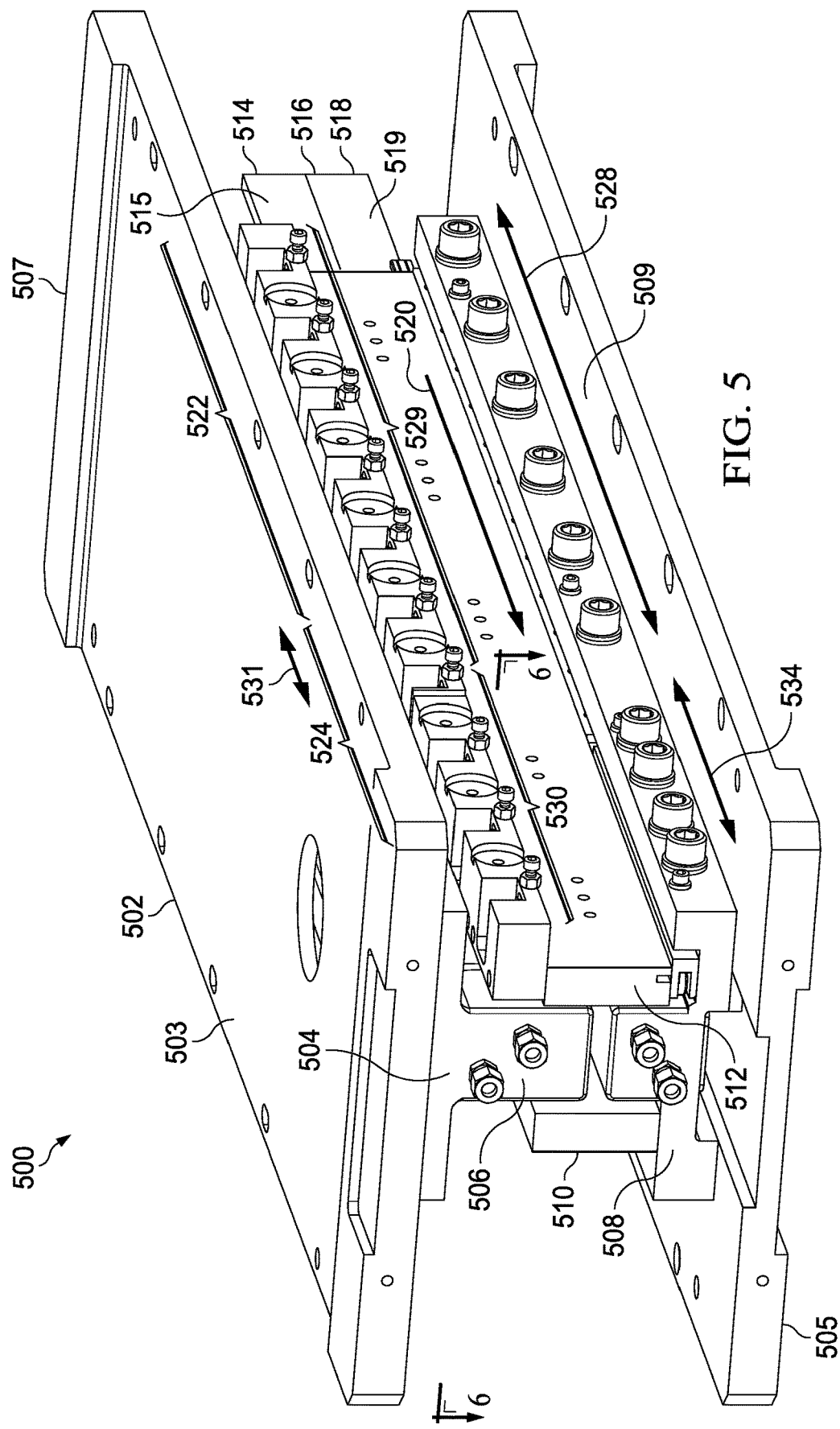
FIG. 5 is an illustration of a continuous compression molding machine in accordance with an illustrative embodiment.

With reference now to FIG. 5, an illustration of a continuous compression molding machine is depicted in accordance with an illustrative embodiment. Continuous compression molding machine 500 is an example of one implementation for continuous compression molding machine 118 and the different components for continuous compression molding machine 118 shown in block form in FIGS. 1-4.

As depicted, continuous compression molding machine 500 comprises platform 502. In this illustrative example, tooling die 504 is upper tooling die 506 and is associated with top side 503 of platform 502. Platform 502 also has end 505, end 507, and bottom side 509.

Continuous compression molding machine 500 also includes lower tooling die 508, side tooling die 510, and side tooling die 512. These tooling dies are also associated with platform 502.

When one component is "associated" with another component, the association is a physical association. For example, a first component, such as tooling die 504, may be considered to be physically associated with a second component, such as platform 502, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both. In some cases, the first component may be movable with respect to the second component as part of being associated with the second component. In this illustrative example, upper tooling die 506 and lower tooling die 508 are fixed on platform 502. On the other hand, side tooling die 510 and side tooling die 512 are moveably connected to platform 502.

In this illustrative example, tooling sleeve 514 is first tooling sleeve 516 corresponding to upper tooling die 506. Second tooling sleeve 518 corresponds to lower tooling die 508. As depicted both first tooling sleeve 516 and second tooling sleeve 518 move along upper tooling die 506 and lower tooling die 508 in the direction of arrow 520.

As depicted, first tooling sleeve 516 has flexible flange 515. Second tooling sleeve 518 has flexible flange 519. These flexible flanges may be biased to different angles from the original angle for the tooling sleeves. These flexible flanges return to the original angles when pressure is no longer applied to the flanges.

In this example, heating zone 522 and cooling zone 524 are present in continuous compression molding machine 500. The temperatures in these zones are generated by a heating system, not show in this figure.

Other components that are part of continuous compression molding machine 500 are not shown in order to avoid obscuring the depiction and description of features for manufacturing a thermoplastic composite part with increased integrity. For example, heaters, connections to heaters, and other components used in continuous compression molding machine 500 are not shown in this view.

Also, shown in this view of continuous compression molding machine 500 are lower seal bar 528, upper seal bar 529, upper guide bar 530, and lower guide bar 534. As depicted, lower seal bar 528 and upper seal bar 529 are present in heating zone 522 and portion 531 of cooling zone 524. Upper guide bar 530 and lower guide bar 534 are present in cooling zone 524. Lower guide bar 534 begins where lower seal bar 528 ends, and upper guide bar 530 begins where upper seal bar 529 ends. This change happens at a set point in cooling zone 524 when the part (not shown) is solidified, which is based on cooling rate, part geometry, material usage, and other suitable factors.

The guide bars are used to do at least one of setting or changing the angles for first tooling sleeve 516 and second tooling sleeve 518. The change in these angles results in a change in the angles for features in the thermoplastic composite part being formed from a thermoplastic composite charge. The seal bars hold the tooling sleeve at a desired angle. The seal bars may be biased using a biasing system, such as springs, to hold at least one of first tooling sleeve 516 and second tooling sleeve 518 at a desired angle.

For example, at least one of lower seal bar 528, upper seal bar 529, upper guide bar 530, or lower guide bar 534 sets the tooling sleeves to different angles for first tooling sleeve 516 and second tooling sleeve 518 while these tooling sleeves move along upper tooling die 506 and lower tooling die 508, respectively, in the direction of arrow 520 in continuous compression molding machine 500 shown in accordance with an illustrative embodiment.

In these illustrative examples, the biasing is performed using pressures applied to the tooling sleeves. Increasing or decreasing the pressure may be used to change the angles for the tooling sleeves in a manner that changes the angles for the thermoplastic composite charges being processed within continuous compression molding machine 500 to form thermoplastic composite parts.

These desired angles are obtained by biasing first tooling sleeve 516 and second tooling sleeve 518 against upper tooling die 506 and lower tooling die 508, respectively. In other words, the tooling dies are configured as a template or guide to define the angles. The configuration of these tooling dies changes over the length of the tooling dies to provide the different angles.

Figure 6:
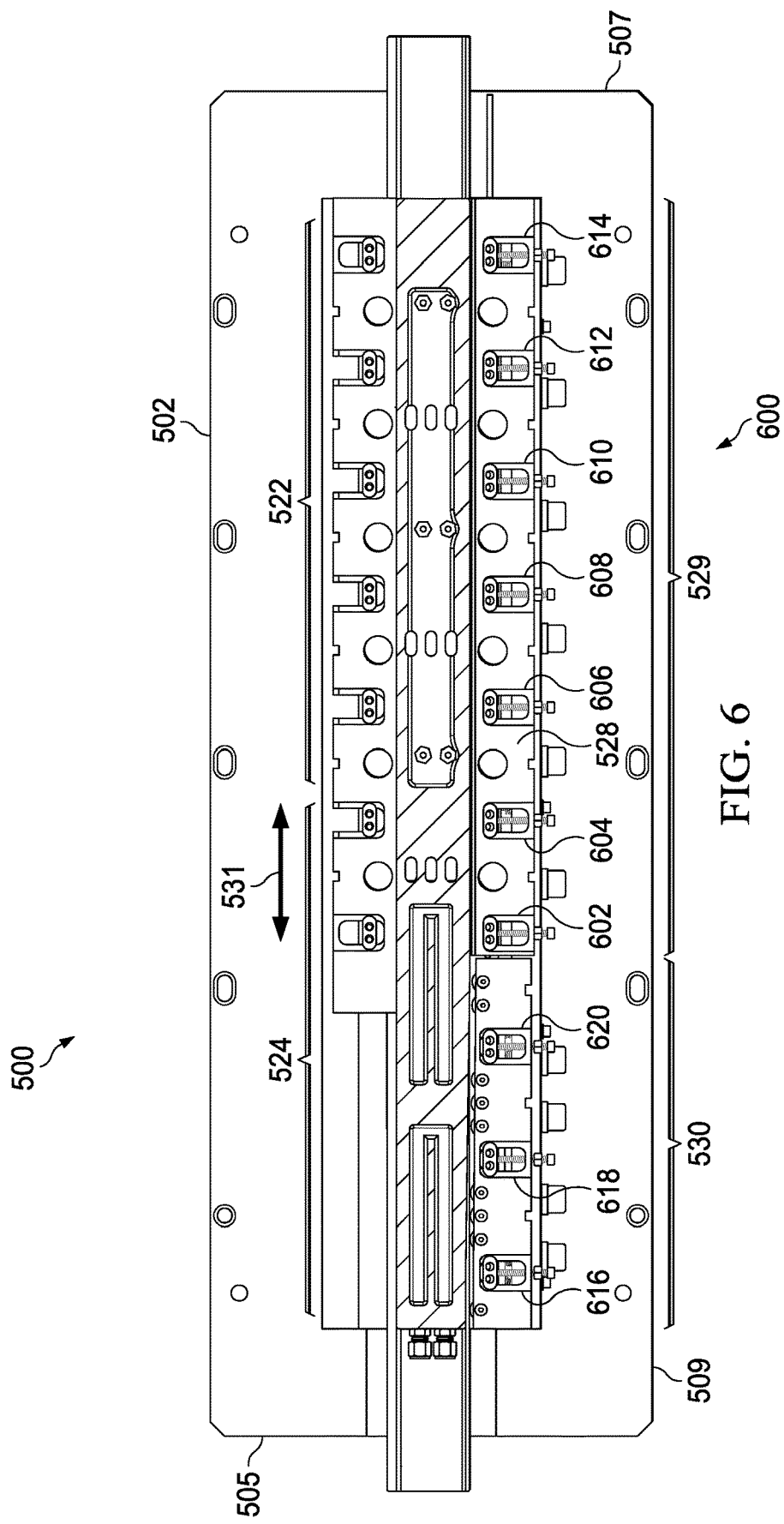
FIG. 6 is an illustration of cross-sectional view of a continuous compression molding machine in accordance with an illustrative embodiment.

Turning now to FIG. 6, an illustration of a cross-sectional view of a continuous compression molding machine is depicted in accordance with an illustrative embodiment. In this figure, a cross-sectional view of continuous compression molding machine 500 taken along lines 6-6 in FIG. 5 is depicted. Upper guide bar 530 and upper seal bar 529 are seen in this cross-sectional view.

Biasing system 600 is seen in this figure. Biasing system 600 comprises compression springs, such as compression spring 602, compression spring 604, compression spring 606, compression spring 608, compression spring 610, compression spring 612, and compression spring 614 in upper seal bar 529. Biasing system 600 also includes compression spring 616, compression spring 618, and compression spring 620 in upper guide bar 530.

Figure 7:
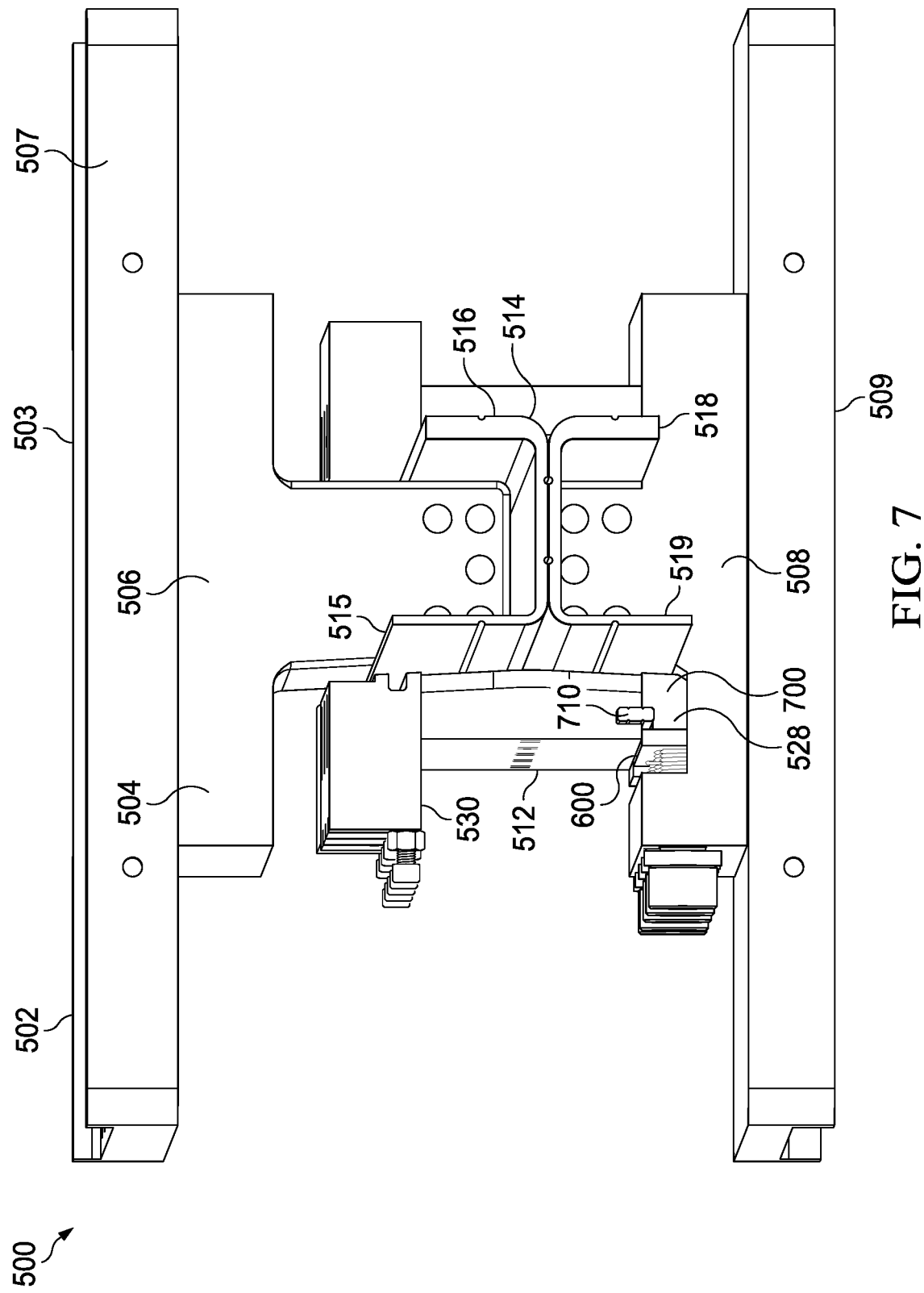
FIG. 7 is an illustration of an end of a continuous compression molding machine in accordance with an illustrative embodiment.

Turning now to FIG. 7, an illustration of an end of a continuous compression molding machine is depicted in accordance with an illustrative embodiment. FIG. 7 shows a view of end 507 of continuous compression molding machine 500.

In this view, an illustration of lower seal bar 528 is shown. As depicted, lower seal bar 528 comprises elongate member 700. Elongate member 700 may be biased by biasing system 600 using the Belleville washers as described above.

Lower seal bar 528 may be biased away from second tooling sleeve 518 with key 710 to allow for advancing first tooling sleeve 516 and second tooling sleeve 518. In the illustrative example, key 710 is a piece of brass stock that fits into a slot in side tooling die 512. When side tooling die 512 retracts, key 710 comes into contact with biasing system 600. In the illustrative example, biasing system 600 may retract lower seal bar 528 when side tooling die 512 opens. This movement reduces friction between the sleeve and the die in case there is too much frictional force to pull the tooling sleeves with the composite charge through the dies.

Figure 8:
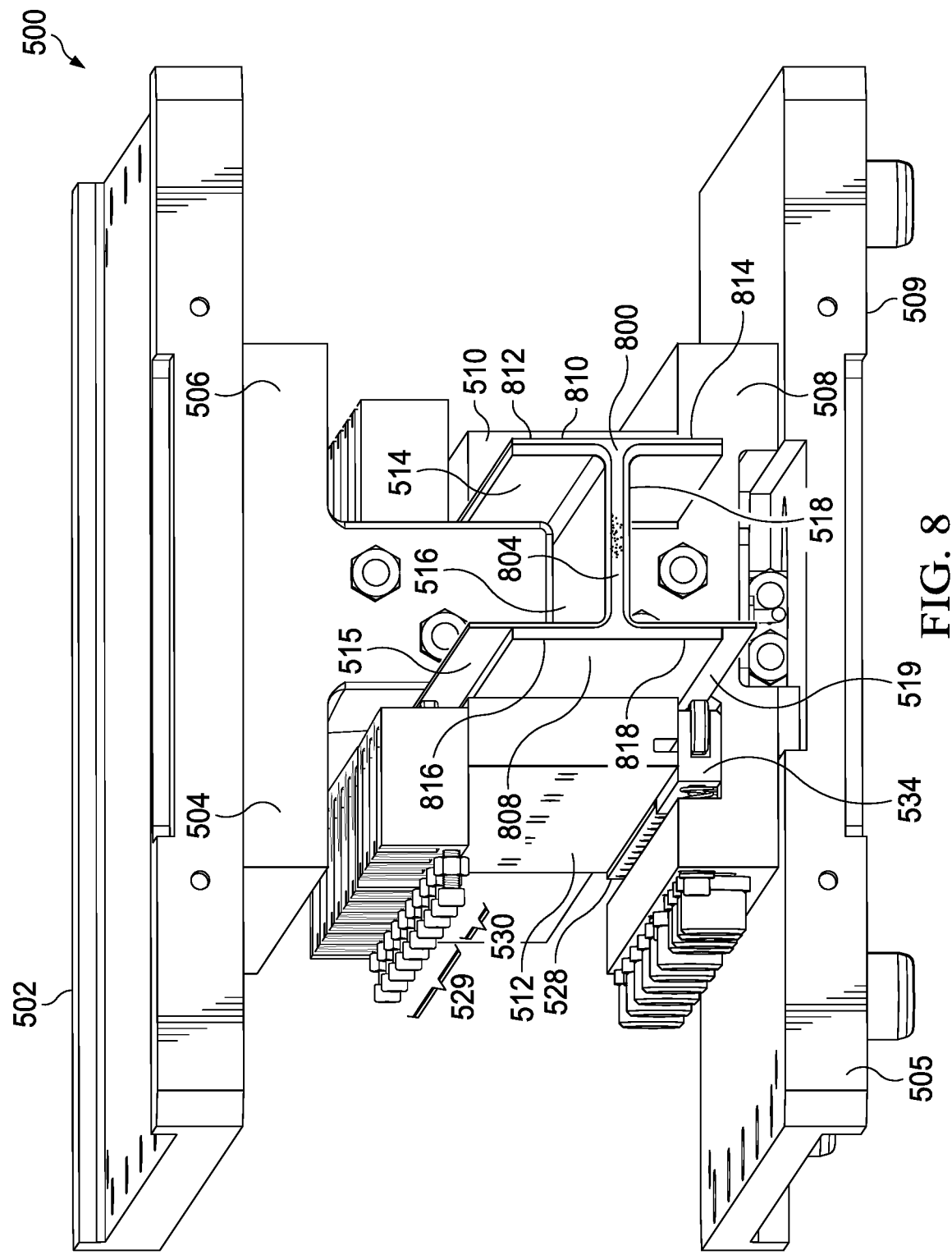
FIG. 8 is an illustration of an end of a continuous compression molding machine with a thermoplastic composite charge in accordance with an illustrative embodiment.

Turning now to FIG. 8, an illustration of an end of a continuous compression molding machine with a thermoplastic composite charge is depicted in accordance with an illustrative embodiment. In this illustrative example, end 505 of continuous compression molding machine 500 is shown.

In this view, thermoplastic composite charge 800 is shown. In this example, first tooling sleeve 516 is located between thermoplastic composite charge 800 and upper tooling die 506. Similarly, second tooling sleeve 518 is located between thermoplastic composite charge 800 and lower tooling die 508. As depicted in this illustrative example, thermoplastic composite charge 800 is for a thermoplastic composite part in the form of an I-beam. In this illustrative example, thermoplastic composite charge 800 has side 808 and side 810. Flange 812 and flange 814 are thin enough that spring back is present. On the other hand, flange 816 and flange 818 on side 808 have a thickness such that spring back is not an issue in this particular example. As a result, the change in angles is only performed for side 810 of thermoplastic composite charge 800.

In the illustrative example, the angle of flange 812 relative to main structure 804 of thermoplastic composite charge 800 is set by the angle of first tooling sleeve 516. The angle of flange 814 relative to main structure 804 is set by the angle of second tooling sleeve 518. The angle of these tooling sleeves is based on the angle of upper tooling die 506 and lower tooling die 508, respectively. For example, the angles are for flexible flange 515 in first tooling sleeve 516 and flexible flange 519 in second tooling sleeve 518.

In other words, first tooling sleeve 516 is biased against upper tooling die 506 to set the angle for first tooling sleeve 516 based on the angle of upper tooling die 506. In a similar fashion, second tooling sleeve 518 is biased against lower tooling die 508. As a result, the angle of second tooling sleeve 518 is based on the angle of a part of lower tooling die 508.

In this illustrative example, flange 816 and flange 818 are thicker than flange 812 and flange 814. As depicted, changing the angle of these two flanges is not necessary, in this example, because spring back is not an issue with flange 816 and flange 818. Biasing of guide bars and seal bars on the other side of flange 816 and flange 818 are unnecessary in this particular example. Thus, only one side of the tooling sleeves are biased to change the angles in this illustrative example.

Figure 9:
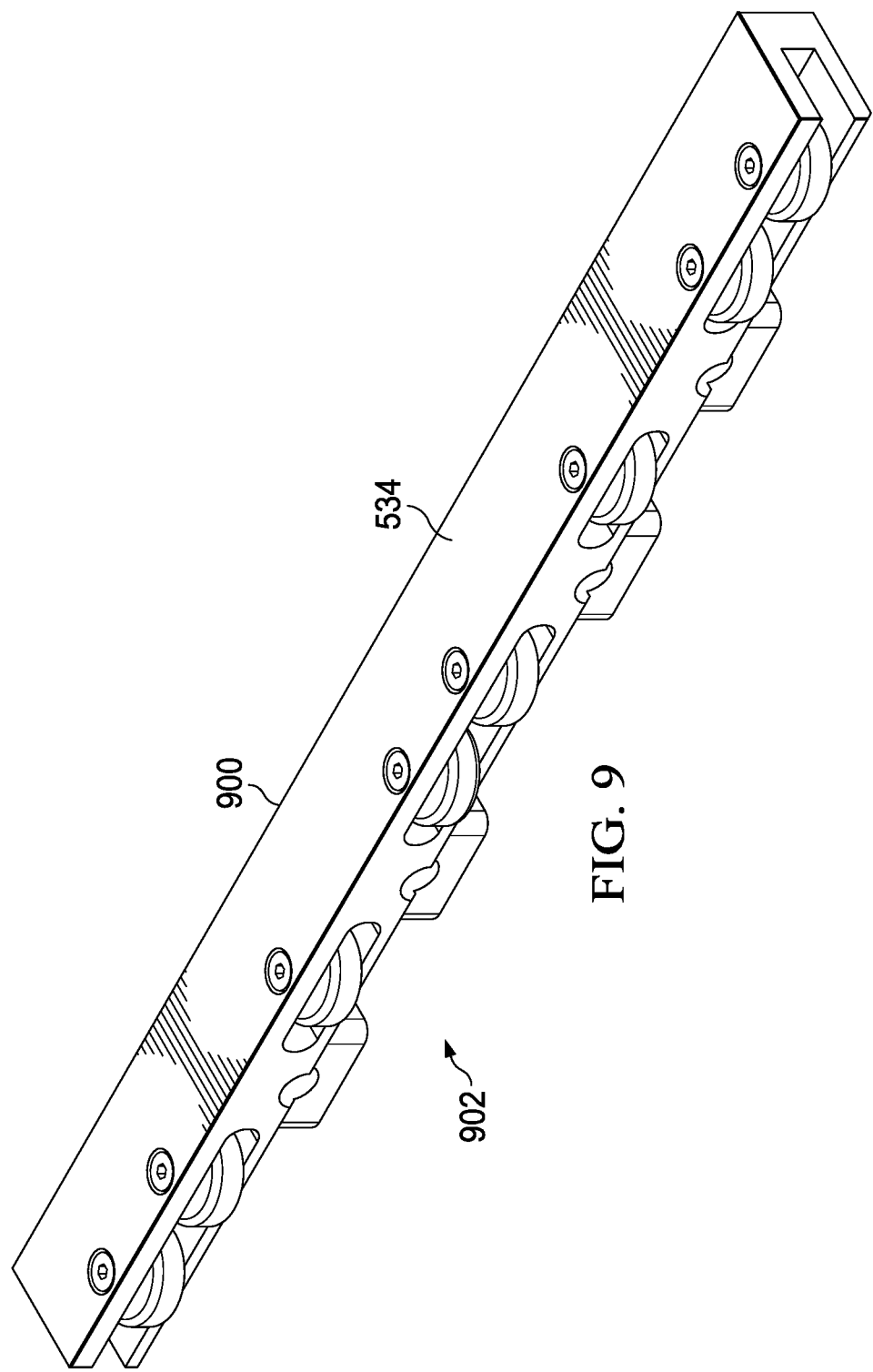
FIG. 9 is an illustration of a lower guide bar in accordance with an illustrative embodiment.

With reference to FIG. 9, an illustration of a lower guide bar is depicted in accordance with an illustrative embodiment. In this figure, an illustration of lower guide bar 534 is provided. As depicted, lower guide bar 534 comprises elongate member 900 and wheels 902. Wheels 902 are examples of guiding members that may contact second tooling sleeve 518 shown in FIG. 5.

Wheels 902 apply pressure to second tooling sleeve 518 to position second tooling sleeve 518 against lower tooling die 508, shown in FIG. 5, to obtain a second angle for second tooling sleeve 518. The second angle for second tooling sleeve 518 also results in the thermoplastic composite charge being processed on second tooling sleeve 518 to form the thermoplastic composite part having the second angle. In this manner, lower guide bar 534 and other guide bars ensure that sleeves are positioned against the different dies to obtain desired angles during processing of thermoplastic composite charges to form thermoplastic composite parts.

Figure 10:
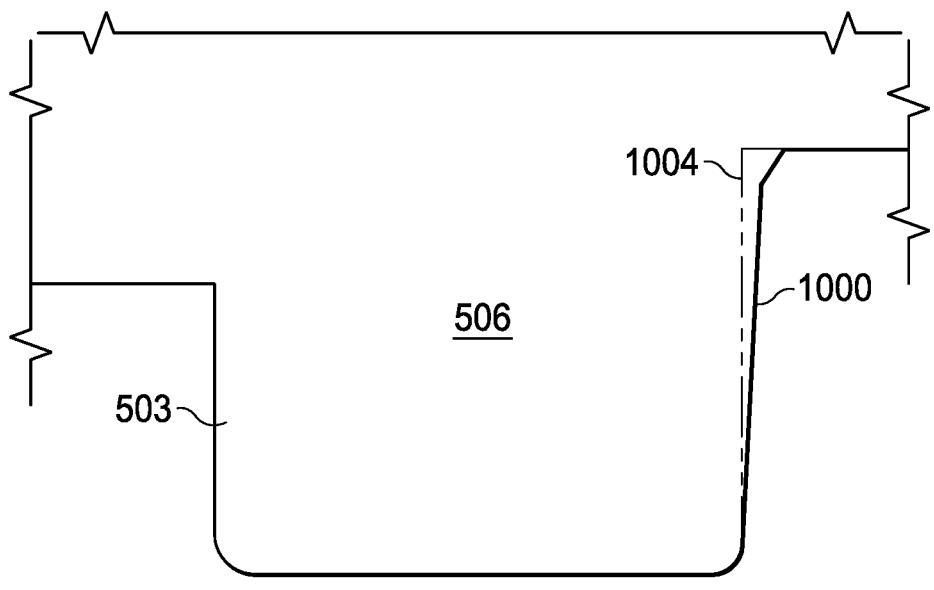
FIG. 10 is an illustration of angles on tooling dies in accordance with an illustrative embodiment.
Figure 10:
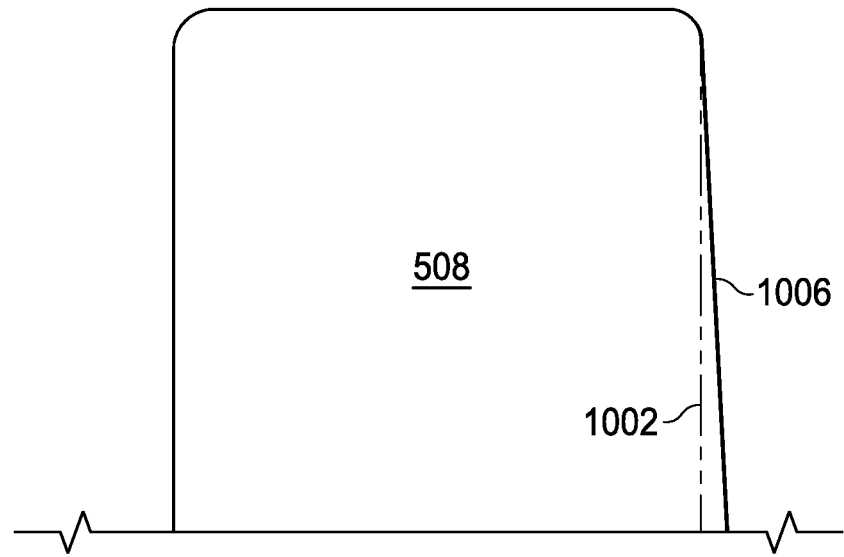

Turning next to FIG. 10, an illustration of angles on tooling dies are depicted in accordance with an illustrative embodiment. In this example, an illustration of upper tooling die 506 and lower tooling die 508 from top side 503 is depicted in accordance with an illustrative embodiment.

In this illustrative example, upper tooling die 506 and lower tooling die 508 have an angle of 90 degrees on side 1000 and side 1006 as shown by line 1004 and line 1002 respectively, in heating zone 522 of FIG. 5. Top side 503 is in cooling zone 524 of FIG. 5. Upper tooling die 506 and lower tooling die 508 have an angle of 92 degrees on side 1000 and side 1002 at top side 503.

As shown in this example, the angle of upper tooling die 506 and lower tooling die 508 change over the length of these tooling dies. As a result, when the tooling sleeves are biased against the tooling dies, angles also change as the tooling sleeves move along the tooling dies.

The illustration of continuous compression molding machine 500 in FIGS. 5-10 are shown for purposes of illustrating one manner in which continuous compression molding machine 118 shown in block form maybe implemented and has a physical machine. Although Belleville washers are shown for biasing system 600, other types of biasing devices may be used. For example, any type of spring may be used, in addition to or in place of the Belleville washers, in biasing system 600. For example, at least one of a coil spring, a leaf spring, a compression spring, a variable spring, a flat spring, a serpentine spring, a cantilever spring, or other suitable types of springs may be used within biasing system 600.

As another example, another I beam may have thinner flanges on both sides affected by spring back. With this type of thermoplastic composite part, the tooling die have changes in the angles on both sides. Also, guide bars and seal bars are utilized on both sides to bias both flanges of the tooling sleeves against the tooling dies to take into account the spring back.

Thus, one or more illustrative examples allow for the manufacturing of thermoplastic composite parts using flexible tooling sleeves with strategic guiding rollers to allow for angle spring back compensation during the manufacturing of thermoplastic composite parts. The flexible flange in the tooling sleeve provides a "hinge point" in the tooling sleeve so that the flanges of the sleeve can rotate inwards as the sleeve runs through the continuous compression molding machine. A tooling sleeve with a flexible flange enables spring back compensation to reduce the residual stresses that develop during the manufacturing process. In this manner, the technical effect is present that improves the manufacturing precision and dimensional control of the angles in thermoplastic composite parts.

Figure 11:
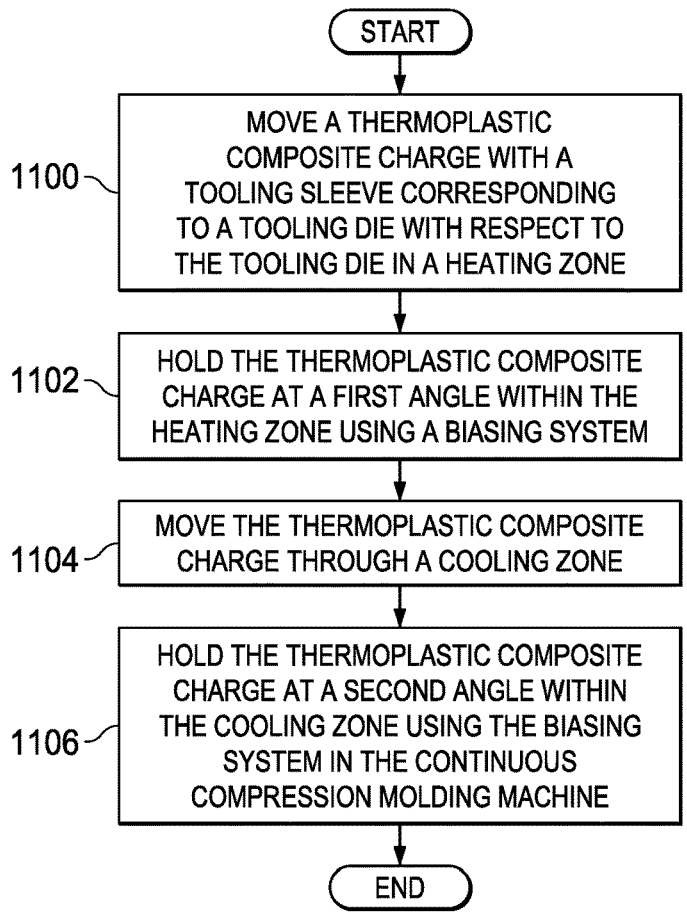
FIG. 11 is an illustration of a flowchart of a process for forming a thermoplastic composite part in accordance with an illustrative embodiment.

Turning next to FIG. 11, an illustration of a flowchart of a process for forming a thermoplastic composite part is depicted in accordance with an illustrative embodiment. The process illustrated in FIG. 11 may be implemented in thermoplastic composite part manufacturing environment 100 in FIG. 1. One or more of the different operations depicted may be prevented using continuous compression molding machine 118 and the components for this machine as shown in block form in FIGS. 1-4.

The process begins by moving a thermoplastic composite charge with a tooling sleeve corresponding to a tooling die with respect to the tooling die in a heating zone (operation 1100). The thermoplastic composite charge is used to form the thermoplastic composite part. In this illustrative example, the tooling sleeve and the tooling die are located in the continuous compression molding machine.

The process holds the thermoplastic composite charge at a first angle within the heating zone using a biasing system (operation 1102). The process moves the thermoplastic composite charge through a cooling zone (operation 1104). The process holds the thermoplastic composite charge at a second angle within the cooling zone using the biasing system in the continuous compression molding machine (operation 1106). With the process terminating thereafter. The first angle is different from the second angle.

With this process, a portion of the tooling sleeve with the thermoplastic composite charge may be present in both the heating zone and the cooling zone as the tooling sleeve moves along the tooling die. As a result, a portion of the tooling sleeve may have the first angle while still in the heating zone while another portion of the tooling sleeve may have the second angle while in the cooling zone.

Figure 12:
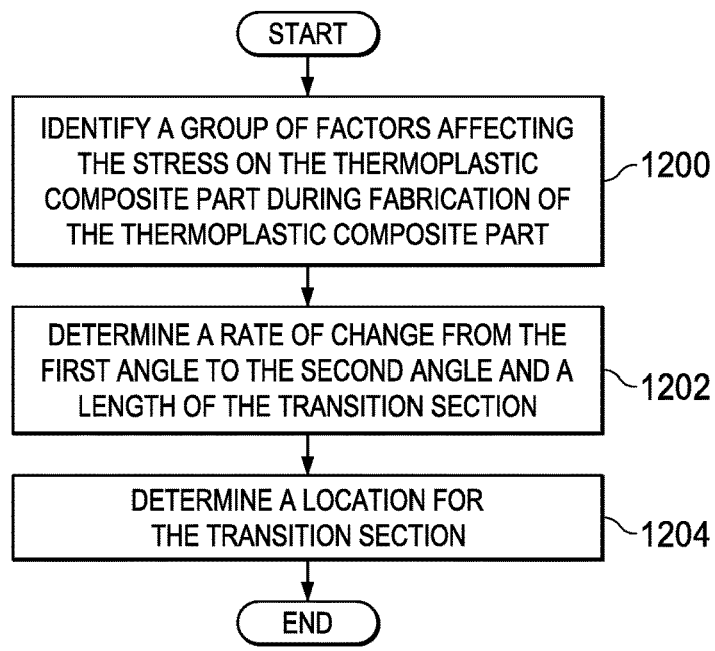
FIG. 12 is an illustration of a flowchart of a process for determining a transition section in accordance with an illustrative embodiment.

With reference next to FIG. 12, an illustration of a flowchart of a process for determining a transition section is depicted in accordance with an illustrative embodiment. This process may be used to determine transition section 316 in FIG. 3.

The transition section is a length or distance along which the angle is changed for a thermoplastic charge being processed to form the thermoplastic composite part. In other words, the transition section is where the angle is changed while the thermoplastic composite part is being fabricated on one or more tooling sleeves.

The process begins by identifying a group of factors affecting the stress on the thermoplastic composite part during fabrication of the thermoplastic composite part (operation 1200). These factors may include at least one of material use, part geometry, part thickness, heating rate, cooling rate, and other suitable parameters. In this illustrative example, the stress on the thermoplastic composite part may reflect at least one of structural integrity, strength, frequency of maintenance, development of inconsistencies, or other parameters.

The process determines a rate of change from the first angle to the second angle and a length of the transition section (operation 1202). This rate of change may be constant or may vary within the transition section. For example, the angular change is calculated based on various inputs including the composite part material properties, the composite part material geometry, the tooling material properties, the tooling material geometry, the processing parameters used for part fabrication, and other suitable parameters.

The process also determines a location for the transition section (operation 1204). The process terminates thereafter. For example, the transition section may begin when the heating zone ends and the cooling zone begins. In some illustrative examples, the transition section may begin at the end of the heating zone or some other location.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the flowchart in FIG. 11 may include a transitioning zone. With a transitioning zone, the process may transition from holding the thermoplastic composite charge from the first angle to the second angle in transition section located in at least one of the heating zone or the cooling zone. The transition section is an area in which the angle at which the thermoplastic composite part changes.

Figure 13:
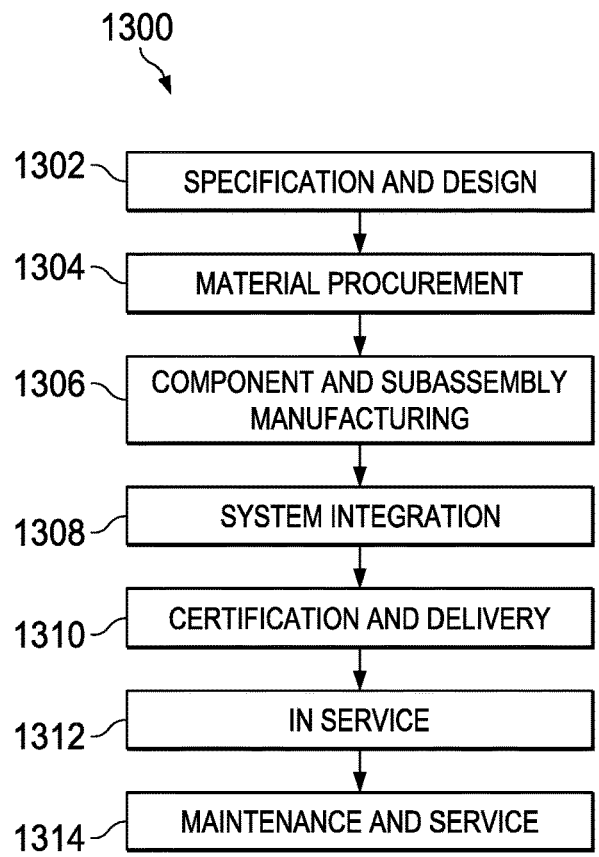
FIG. 13 is an illustration of a block diagram of an aircraft manufacturing and service method in accordance with an illustrative embodiment.
Figure 14:
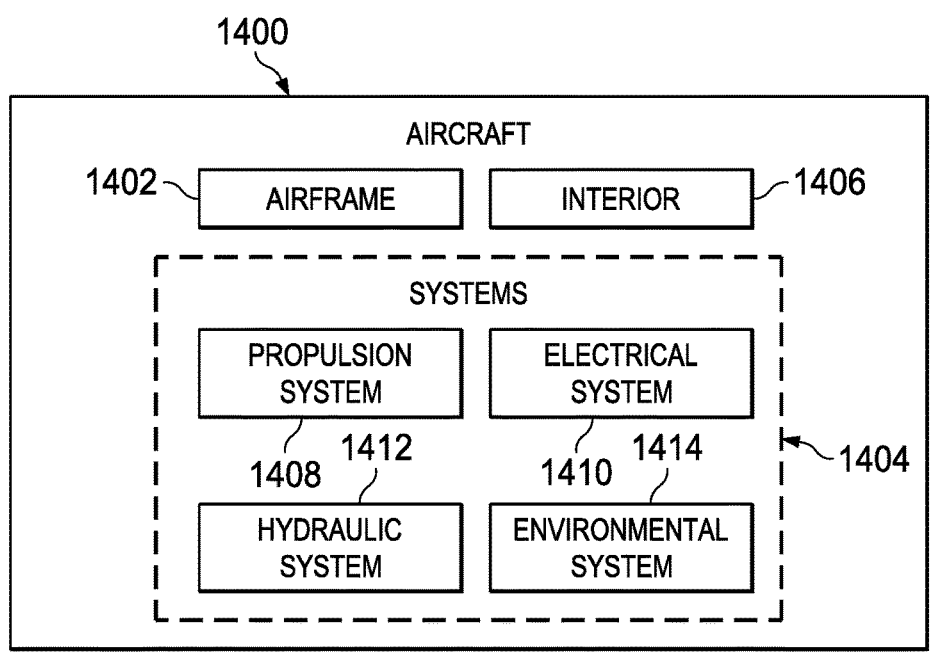
FIG. 14 is an illustration of a block diagram of an aircraft in which an illustrative embodiment may be implemented.

The illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, or other maintenance and service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13.

As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both.

For example, one or more illustrative embodiments may be used to manufacture thermoplastic composite parts during one or more of these different stages of aircraft manufacturing and service method 1300. For example, thermoplastic composite parts may be manufactured during component and subassembly manufacturing 1306. These components may be used in producing aircraft 1400 for providing routine maintenance and service 1314.

The use of a number of the different illustrative embodiments may substantially expedite the assembly of aircraft 1400, reduce the cost of aircraft 1400, or both expedite the assembly of aircraft 1400 and reduce the cost of aircraft 1400. Thermoplastic composite parts manufactured in thermoplastic composite part manufacturing environment 100 may have longer lifespans, increased structural integrity, reduced maintenance needs, or other desirable characteristics.

Figure 15:
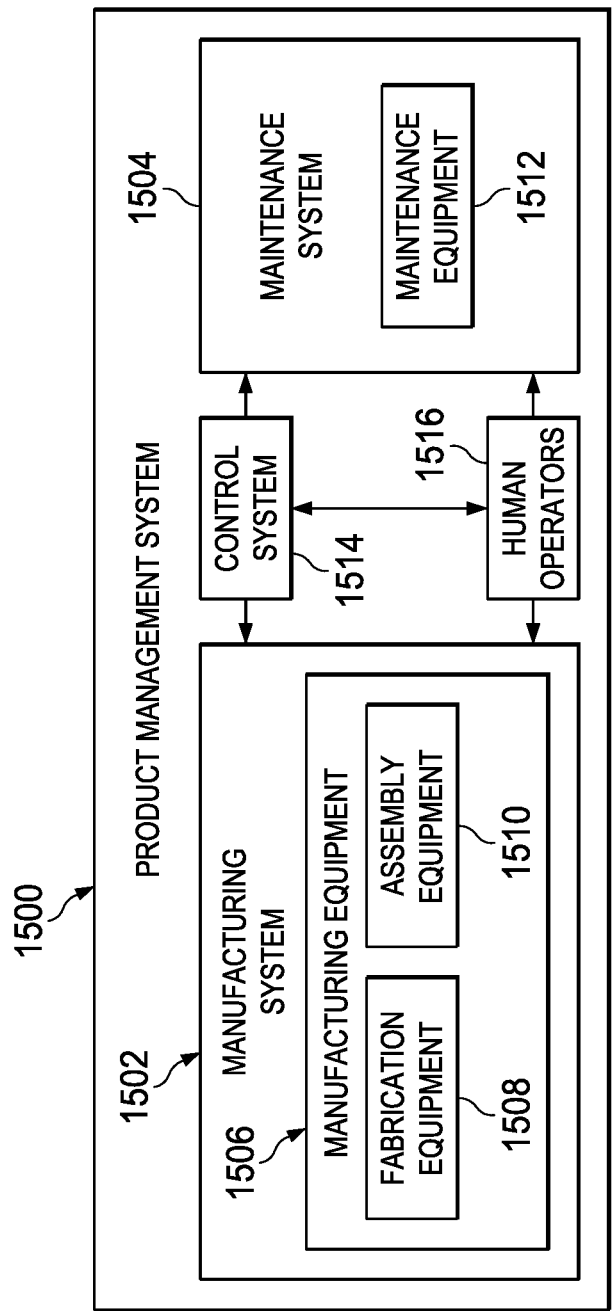
FIG. 15 is an illustration of a block diagram of a product management system in accordance with an illustrative embodiment.

Turning now to FIG. 15, an illustration of a block diagram of a product management system is depicted in accordance with an illustrative embodiment. Product management system 1500 is a physical hardware system. In this illustrative example, product management system 1500 may include at least one of manufacturing system 1502 or maintenance system 1504.

Manufacturing system 1502 is configured to manufacture products, such as aircraft 1400 in FIG. 14. As depicted, manufacturing system 1502 includes manufacturing equipment 1506. Manufacturing equipment 1506 includes at least one of fabrication equipment 1508 or assembly equipment 1510.

Fabrication equipment 1508 is equipment that may be used to fabricate components for parts used to form aircraft 1400. For example, fabrication equipment 1508 may include machines and tools. These machines and tools may be at least one of a drill, a hydraulic press, a furnace, a mold, a composite tape laying machine, a vacuum system, a lathe, or other suitable types of equipment. Fabrication equipment 1508 may be used to fabricate at least one of metal parts, composite parts, semiconductors, circuits, fasteners, ribs, skin panels, spars, antennas, or other suitable types of parts.

In this illustrative example, continuous compression molding fabrication line 102 in FIG. 1 may be included in fabrication equipment 1508. For example, continuous compression molding machine 118 may be used to manufacture thermoplastic composite parts from thermoplastic charges that have increased quality as compared to currently manufactured parts using currently available processes and machines.

Assembly equipment 1510 is equipment used to assemble parts to form aircraft 1400. In particular, assembly equipment 1510 may be used to assemble components and parts to form aircraft 1400. Assembly equipment 1510 also may include machines and tools. These machines and tools may be at least one of a robotic arm, a crawler, a faster installation system, a rail-based drilling system, or a robot. Assembly equipment 1510 may be used to assemble parts such as seats, horizontal stabilizers, wings, engines, engine housings, landing gear systems, and other parts for aircraft 1400.

In this illustrative example, maintenance system 1504 includes maintenance equipment 1512. Maintenance equipment 1512 may include any equipment needed to perform maintenance on aircraft 1400. Maintenance equipment 1512 may include tools for performing different operations on parts on aircraft 1400. These operations may include at least one of disassembling parts, refurbishing parts, inspecting parts, reworking parts, manufacturing replacement parts, or other operations for performing maintenance on aircraft 1400. These operations may be for routine maintenance, inspections, upgrades, refurbishment, or other types of maintenance operations.

In the illustrative example, maintenance equipment 1512 may include ultrasonic inspection devices, x-ray imaging systems, vision systems, drills, crawlers, and other suitable device. In some cases, maintenance equipment 1512 may include fabrication equipment 1508, assembly equipment 1510, or both to produce and assemble parts that may be needed for maintenance.

Product management system 1500 also includes control system 1514. Control system 1514 is a hardware system and may also include software or other types of components. Control system 1514 is configured to control the operation of at least one of manufacturing system 1502 or maintenance system 1504. In particular, control system 1514 may control the operation of at least one of fabrication equipment 1508, assembly equipment 1510, or maintenance equipment 1512.

The hardware in control system 1514 may be using hardware that may include computers, circuits, networks, and other types of equipment. The control may take the form of direct control of manufacturing equipment 1506. For example, robots, computer-controlled machines, and other equipment may be controlled by control system 1514. In other illustrative examples, control system 1514 may manage operations performed by human operators 1516 in manufacturing or performing maintenance on aircraft 1400. For example, control system 1514 may assign tasks, provide instructions, display models, or perform other operations to manage operations performed by human operators 1516.

In the different illustrative examples, human operators 1516 may operate or interact with at least one of manufacturing equipment 1506, maintenance equipment 1512, or control system 1514. This interaction may be performed to manufacture aircraft 1400.

Of course, product management system 1500 may be configured to manage other products other than aircraft 1400. Although aircraft management system 1500 has been described with respect to manufacturing in the aerospace industry, product management system 1500 may be configured to manage products for other industries. For example, product management system 1500 may be configured to manufacture products for the automotive industry as well as any other suitable industries. With continuous compression molding fabrication line 102, product management system 1500 may operate with increased efficiencies and lower cost as well as manufacture thermoplastic composite parts with increased desirable characteristics.

In one illustrative example, one or more technical solutions are present that overcome a technical problem with manufacturing thermoplastic composite parts with a desired level of integrity and consistency. As a result, one or more technical solutions may provide a technical effect increasing the level of integrity of thermoplastic composite parts in addition to increasing other characteristics of the thermoplastic composite parts. For example, thermoplastic composite parts manufactured using one or more illustrative examples may have at least one of increased strength, reduce maintenance, increase longevity, or other desirable characteristics.

For example, one or more illustrative examples have a technical effect of reducing residual stresses developed in angles of variable thickness composite parts that occurred during continuous compression machine processing. For example, when the flange is positioned at different angles while the thermoplastic composite part is being formed, the residual stress buildup at corner radii from holding a flange at a greater angle to take spring back is reduced.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   reducing residual stresses developed in angles of a thermoplastic composite part during processing in a continuous compression molding machine by:
      moving a thermoplastic composite charge for forming the thermoplastic composite part together with a tooling sleeve corresponding to a tooling die through a heating zone of the tooling die, wherein:

the tooling sleeve and the tooling die are located in the continuous compression molding machine; and the thermoplastic composite charge comprises a first flange that comprises a flexible flange;

holding the flexible flange of the thermoplastic composite charge at a first angle within the heating zone using the tooling sleeve and a biasing system, wherein the biasing system comprises at least one of a guide bar, springs, or a seal bar;

moving the thermoplastic composite charge through a cooling zone of the tooling die; and holding the flexible flange of the thermoplastic composite charge at a second angle within the cooling zone using the tooling sleeve and the biasing system in the continuous compression molding machine, wherein the first angle is different from the second angle, wherein the biasing system provides a transition section in the flexible flange of the thermoplastic composite charge that enables spring back compensation to reduce residual stresses that develop during processing and wherein the transition section is stationary with respect to the continuous compression molding machine and located after holding the thermoplastic composite charge at the first angle and before holding the thermoplastic composite charge at the second angle.

2. The method of claim 1 further comprising:
transitioning from holding the thermoplastic composite charge from the first angle to the second angle in a transition section located in at least one of the heating zone or the cooling zone.

3. The method of claim 1, wherein the guide bar holds the tooling sleeve at the second angle in the cooling zone such that the thermoplastic composite charge has the second angle.

4. The method of claim 3, wherein the guide bar comprises:
an elongate member; and
guiding elements comprising at least one of a pin, a roller, or a wheel for applying pressure to the tooling sleeve, such that the tooling sleeve has the second angle.

5. The method of claim 1, wherein the tooling die has the second angle in the cooling zone.

6. The method of claim 1, wherein the seal bar holds the tooling sleeve at the first angle in the heating zone.

7. The method of claim 1, wherein the tooling sleeve has the first angle without being biased.

8. The method of claim 1, wherein the thermoplastic composite charge has a second flange, and wherein holding the thermoplastic composite charge at the first angle within the heating zone using the biasing system comprises:
holding the second flange of the thermoplastic composite charge at the first angle within the heating zone using the biasing system; and
wherein holding the thermoplastic composite charge at the second angle within the cooling zone using the biasing system comprises:
holding the second flange of the thermoplastic composite charge at the second angle within the cooling zone using the biasing system.

9. The method of claim 1, wherein the tooling sleeve is comprised of a material that is selected based on:
the material having an original shape prior to heating; and
an ability of the material at a temperature of the heating zone to return to an original shape after being held at the second angle.

10. A method comprising:
forming a thermoplastic composite part in a continuous compression molding machine by:
disposing a tooling die to extend through a heating zone of the continuous compression molding machine and a cooling zone of the continuous compression molding machine, the tooling die comprising a tooling sleeve, a thermoplastic composite charge comprising a first flange, wherein the first flange comprises a flexible flange;

forming the thermoplastic composite part from the thermoplastic composite charge when the tooling sleeve together with the thermoplastic composite charge is moved with respect to the tooling die through the heating zone and the cooling zone;

holding the flexible flange of the thermoplastic composite charge with a biasing system at a first angle within the heating zone as the tooling sleeve moves through the heating zone together with the thermoplastic composite charge, wherein the biasing system comprises at least one of a guide bar, springs, or a seal bar; and holding the flexible flange of the thermoplastic composite charge with the biasing system at a second angle within the cooling zone as the tooling sleeve moves through the cooling zone together with the thermoplastic composite charge, the second angle different than the first angle, wherein the biasing system provides a transition section in the flexible flange of the thermoplastic composite charge that enables spring back compensation to reduce residual stresses that develop during processing and wherein the transition section is stationary with respect to the continuous compression molding machine and located after holding the flexible flange of the thermoplastic composite charge at the first angle and before holding the flexible flange of the thermoplastic composite charge at the second angle.

11. The method of claim 10 further comprising:
transitioning from the first angle to the second angle in a transition section disposed in at least one of the heating zone or the cooling zone.

12. The method of claim 10, further comprising:
holding the tooling sleeve with the guide bar of the biasing system at the second angle in the cooling zone such that the thermoplastic composite charge is held at the second angle.

13. The method of claim 12, further comprising:
applying pressure to the tooling sleeve with a plurality of guiding elements of the guide bar, the plurality of guiding elements comprising at least one of a pin, a roller, or a wheel, such that the tooling sleeve is held at the second angle.

14. The method of claim 10, further comprising:
holding the tooling die at the second angle in the cooling zone.

15. The method of claim 10, further comprising:
holding the tooling sleeve with the seal bar of the biasing system at the first angle in the heating zone.

16. The method of claim 10, wherein the tooling die is an upper tooling die, the tooling sleeve is a first tooling sleeve, and the method further comprises:

disposing a lower tooling die to extend through the heating zone and the cooling zone, the lower tooling die comprising a second tooling sleeve; and forming the thermoplastic composite part from the thermoplastic composite charge when the thermoplastic composite charge is moved with respect to the lower tooling die through the heating zone and the cooling zone, the first tooling sleeve and the second tooling sleeve holding a plurality of portions of the thermoplastic composite charge at a group of first angles within the heating zone and holding the plurality of portions of the thermoplastic composite charge at a group of second angles within the cooling zone as the first tooling sleeve and the second tooling sleeve are moved through the heating zone and the cooling zone with the thermoplastic composite charge.

17. The method of claim 10, further comprising:
holding the tooling sleeve at the first angle without being biased.

18. The method of claim 10, further comprising:
holding a second flange of the thermoplastic composite charge at the first angle in the heating zone and at the second angle in the cooling zone.

19. A method comprising:
forming a thermoplastic composite part in a continuous compression molding machine by:
disposing an upper tooling die to extend through a heating zone and a cooling zone of the continuous compression molding machine, the upper tooling die comprising a first tooling sleeve, the first tooling sleeve adjacent a thermoplastic composite charge comprising a first flange, wherein:
the first flange comprises a flexible flange; and
the flexible flange rotates inward as the first tooling sleeve moves through the continuous compression molding machine;
disposing a lower tooling die to extend through the heating zone and the cooling zone, the lower tooling die comprising a second tooling sleeve;

forming the thermoplastic composite part from the thermoplastic composite charge when the thermoplastic composite charge is moved with respect to the lower tooling die through the heating zone and the cooling zone;

holding a plurality of portions of the thermoplastic composite charge with a biasing system, wherein the biasing system comprises at least one of a guide bar, springs, or a seal bar; and the first tooling sleeve and the second tooling sleeve are held at a group of first angles within the heating zone as the first tooling sleeve and the second tooling sleeve are moved through the heating zone and the cooling zone together with the thermoplastic composite charge; and holding the plurality of portions of the thermoplastic composite charge with the biasing system, the first tooling sleeve and the second tooling sleeve at a group of second angles within at least a portion of the cooling zone as the first tooling sleeve and the second tooling sleeve are moved through the heating zone and the cooling zone together with the thermoplastic composite charge, wherein the biasing system provides a transition section in the thermoplastic composite charge that enables spring back compensation to reduce residual stresses that develop during processing and wherein the transition section is stationary with respect to the continuous compression molding machine and located after holding the plurality of portions of the thermoplastic composite charge at the group of first angles and before holding the plurality of portion of the thermoplastic composite charge at the group of second angles.

20. The method of claim 19, further comprising: holding a second flange of the thermoplastic composite charge at a first angle in the heating zone and at a second angle in the cooling zone, the second angle different than the first angle.

* * * * *